US006868801B2

(12) United States Patent
Rovira Badia et al.

(10) Patent No.: US 6,868,801 B2
(45) Date of Patent: Mar. 22, 2005

(54) LIVESTOCK FEEDING ASSEMBLY

(75) Inventors: Antonio Rovira Badia, Vilafranca (ES); José Franco Tarazaga, Vilafranca (ES)

(73) Assignee: Tecnica e Innovaciones Ganaderas, S.A. (TIGSA), Vilafranca del Penedés (ES)

( * ) Notice: Subject to any disclaimer, the term of this patent is extended or adjusted under 35 U.S.C. 154(b) by 0 days.

(21) Appl. No.: 09/953,753

(22) Filed: Sep. 17, 2001

(65) Prior Publication Data

US 2002/0033141 A1 Mar. 21, 2002

(30) Foreign Application Priority Data

Sep. 15, 2000 (ES) .......................................... 200002251

(51) Int. Cl.[7] .............................. A01K 5/00; A01K 7/06
(52) U.S. Cl. ...................... 119/51.5; 119/52.1; 119/53
(58) Field of Search ........................... 119/51.5, 51.01, 119/51.02, 51.03, 51.12, 51.13, 57, 57.4, 52.1, 53, 53.5, 54, 61, 72

(56) References Cited

U.S. PATENT DOCUMENTS

| | | | | |
|---|---|---|---|---|
| 1,527,360 A | * | 2/1925 | Harless ....................... 119/51.5 |
| 3,547,081 A | * | 12/1970 | Geerlings ................. 119/51.11 |
| 3,780,703 A | * | 12/1973 | Boehland, Jr. ................ 119/53 |
| 4,182,273 A | * | 1/1980 | Peterson ..................... 119/51.5 |
| 4,252,083 A | * | 2/1981 | Gilst et al. ................ 119/51.11 |
| 4,377,130 A | * | 3/1983 | Schwieger .................. 119/51.5 |
| 4,582,023 A | * | 4/1986 | Zumbahlen et al. ........ 119/53.5 |
| 4,676,197 A | * | 6/1987 | Hoover ....................... 119/57.4 |
| 4,790,266 A | * | 12/1988 | Kleinsasser et al. ........ 119/51.5 |
| 4,889,078 A | * | 12/1989 | Smiley ....................... 119/53.5 |
| 4,947,798 A | * | 8/1990 | De Wispelaere .............. 119/53 |
| 4,995,343 A | * | 2/1991 | Cole et al. ..................... 119/53 |
| 5,311,838 A | * | 5/1994 | Thomas et al. ............. 119/51.5 |
| 5,435,267 A | * | 7/1995 | Patterson .................... 119/52.4 |
| 5,447,119 A | * | 9/1995 | Rasmussen ................. 119/51.5 |
| 5,603,285 A | * | 2/1997 | Kleinsasser ................... 119/53 |
| 5,765,503 A | * | 6/1998 | van Daele .................. 119/52.4 |
| 6,192,831 B1 | * | 2/2001 | Brunse ....................... 119/51.5 |
| 6,199,511 B1 | * | 3/2001 | Thibault ........................ 119/53 |
| 6,330,867 B1 | * | 12/2001 | Rasmussen ................ 119/52.1 |

FOREIGN PATENT DOCUMENTS

| | | | |
|---|---|---|---|
| DE | 2843153 | * | 4/1979 |
| DE | 29600621 | * | 6/1996 |

* cited by examiner

*Primary Examiner*—Peter M. Poon
*Assistant Examiner*—David J Parsley
(74) *Attorney, Agent, or Firm*—Steinberg & Raskin, P.C.

(57) ABSTRACT

A livestock feeding assembly including a hopper and a manger interconnected by a frame, the manger being divided into a central area for dry feed and two lateral areas for water, the three transversal areas being separated by two transversal partitions, the central area having raised portion with a stepped edge, at least the lowest step having a slightly concave section.

3 Claims, 3 Drawing Sheets

LIVESTOCK FEEDING ASSEMBLY

BACKGROUND OF THE INVENTION

Livestock feeding assemblies particularly comprising those provided for the feeding of pigs are already known which comprise a hopper from which the feed falls by gravity into a manger, the hopper and manger being connected together by means of a frame, means to supply water to the manger being fitted to the frame, the hopper comprising means to control the feed quantity to be supplied.

BRIEF SUMMARY OF THE INVENTION

It is the object of this invention to improve the livestock feeding assemblies, the improvements concerning the manger, the feed controlling means and other accessories fitted to the frame.

Regarding the manger separate areas are delimited therein for the dry fee and for the water, the area being provided for the dry feed being so shaped that it facilitates its taking on the part of the livestock. Characteristic for such a purpose is the fact that the manger is divided into a central area for the dry feed, and two lateral areas for the water, the three areas being separated by two transversal partitions, the central area comprising a centrally located, raised portion with a stepped edge, at least the lowest step having a slightly concave section, the manger sides being each provided with a drain hole being arranged at a lower level as compared with the top edge of the transversal partitions in order to thus prevent a direct passage of water from the sides to the center of the manger, it being thus left up to the animal itself to at will moisten the dry feed by shifting water from the sides to the center.

The manger is made of plastics material and has its top edge provided with a metallic protector rim protecting the top edge against the actions of the animal.

The feed control means have been provided with a simple construction assuring their easy and safe operation. It is for such a purpose characteristic for these means to comprise a vertical pipe being arranged in a guided arrangement below the hopper and being held by an axial rod associated to a control being arranged externally to the hopper, the rod being at its bottom end attached to the pipe by means of a bushing with radial arms, whereas at its top end the rod is linked in a pin-jointed connection to a transversal holder being apt to be swung around a portion fitted to a transversal shaft of the external control allowing to vertically shift the pipe.

U-shaped guards are fitted to the frame in coincidence with each of both lateral areas of the manger in the same plane of the valve nozzles corresponding to the water supply means, the U-shaped guards protecting the valve nozzles against an accidental actuation on the part of the livestock. Also secured to the frame are a shielding shell surrounding the area where the hopper is facing the vertical pipe of the feed control means, and a clamp serving to guide the pipe.

These and other characteristics will be best made apparent by the following detailed description whose understanding will be made easier by the accompanying three sheets of drawings showing a practical embodiment cited only by way of an example not limiting the scope of the present invention.

DETAILED DESCRIPTION OF PREFERRED EMBODIMENTS

Figure 1:
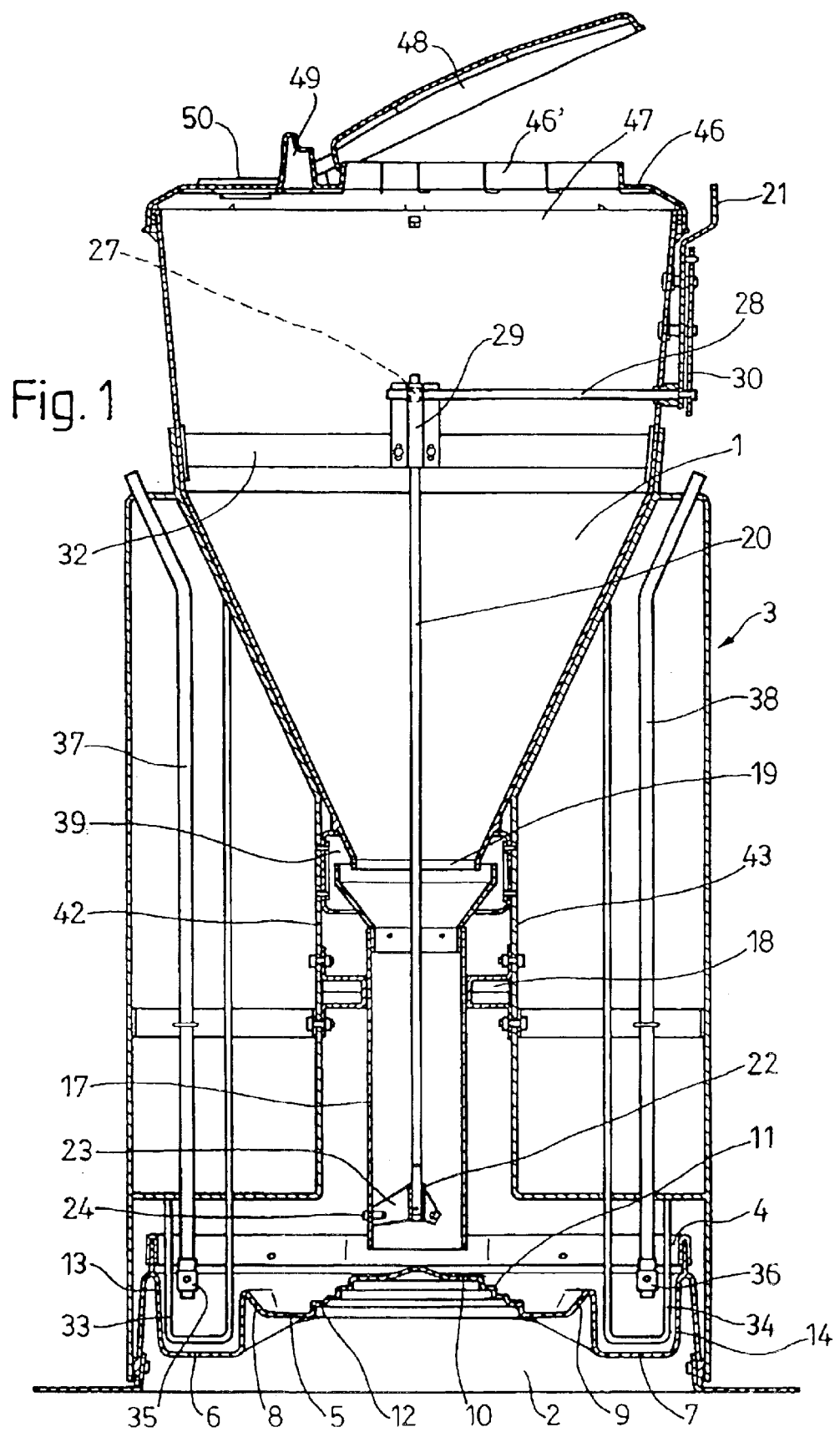
FIG. 1 illustrates in a sectional elevation the livestock feeding assembly.
Figure 2:
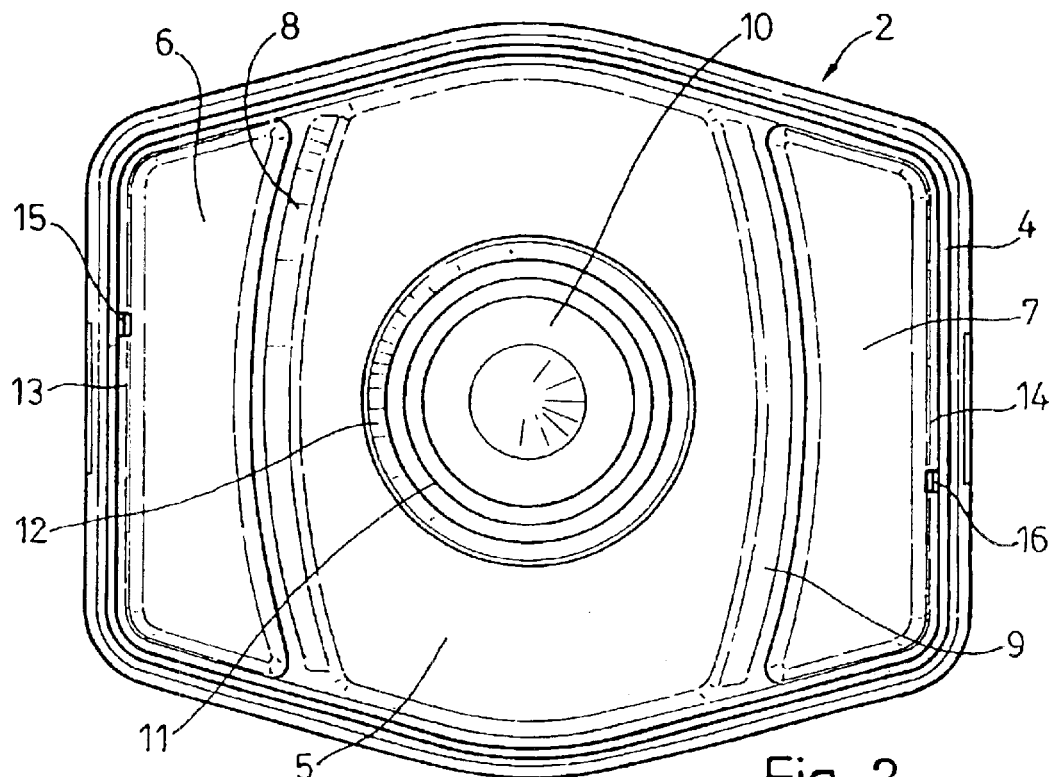
FIG. 2 shows the manger in a plan-view.

According to the drawings this livestock feeding assembly being particularly provided for the feeding of pigs comprises a hopper 1 and a manger 2 being connected together by means of a frame 3.

The manger 2 is formed by one only piece of molded plastics material whose top edge is all around provided with a metallic protector rim 4. The manger is divided into a central area 5 being arranged at a higher level as compared with two lateral areas 6 and 7 and being provided to receive the dry feed or fodder, whereas the other two areas are provided to receive the water, the three areas being separated by two transversal partitions 8 and 9, the central area 5 having a centrally located, raised portion 10 with a stepped edge 11, the lowest step comprising a slightly concave cross-section 12. Each of the manger sides 13 and 14 has a drain hole 15, 16 being arranged at a lower level as compared with the top edge of the transversal partitions 8 and 9. The drain holes 15, 16 and the transversal partitions 8, 9 prevent water from the two lateral areas 6, 7 from contacting the dry feed in the central area 5.

Figure 3:
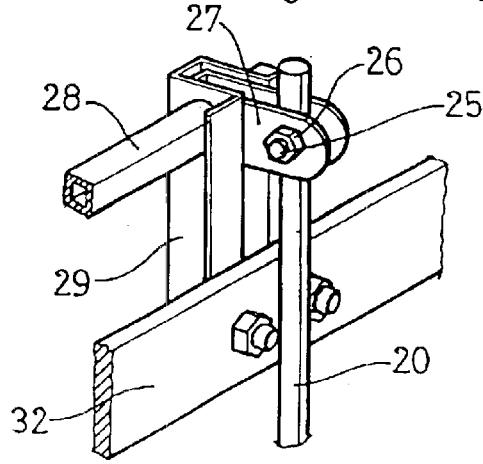
FIG. 3 is a perspective view showing in detail the linked connection between the rod being attached to the vertical pipe and the transversal shaft of the external control.
Figure 4:
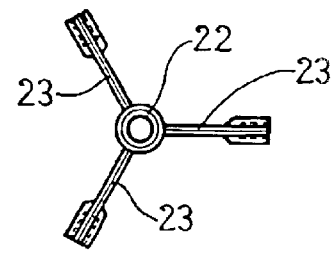
FIG. 4 shows in a plan-view the bushing with radial arms.

The means to control the quantity of dry feed to be supplied to the manger 2 precisely on its central, raised portion 10 comprise a vertical pipe 17 being guided by means of a clamp 18 being secured to the frame 3 below the hopper 1, the vertical pipe 17 facing the open bottom 19 of the hopper and being held by means of an axial rod 20 being associated to an external control 21. The rod 20 is attached to the lower portion of pipe 17 by means of a bushing 22 being secured to the bottom end of the rod and having three radial arms 23 (FIG. 4) being attached to the pipe by means of screws 24. At its top end rod 20 is linked in a pin-jointed connection and by means of a bolt 25 and nut 26 (FIG. 3) to a horizontally arranged, U-shaped transversal holder 27 being fitted to a transversal shaft 28 being integrally fitted to the external control 21 and rotatable with this latter, the shaft having a square cross-section and being supported and guided at its ends in a flanged, rectangular channel 29 and in an external plate 30 having a generally triangular shape whose upperly arranged, arcuate base has been provided in its vicinity with a number of bored holes 31 being apt to selectively retain the control 21, this latter being for such a purpose provided with a projection being apt to be introduced into one of the holes. Channel 29 is secured to a transversal flatbar 32 fitted to the inside of hopper 1.

In coincidence with each of the two lateral areas 6 and 7 of the manger a U-shaped guard 33, 34 is fitted to the frame 3 and is besides arranged in the same plane of each of the valve nozzles 35 and 36 corresponding to the water supply means and receiving the water through pipes 37 and 38 being also fitted to the frame 3. Each of the valve nozzles 35 and 36 are located inside one of the U-shaped guards 33 and 34, respectively.

Figure 5:
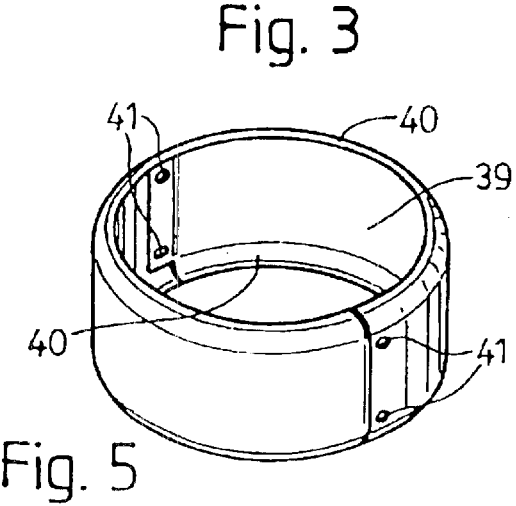
FIGS. 5 and 6 are perspective views of the shell being arranged between the hopper and the vertical pipe, and the clamp guiding said pipe, respectively.
Figure 6:
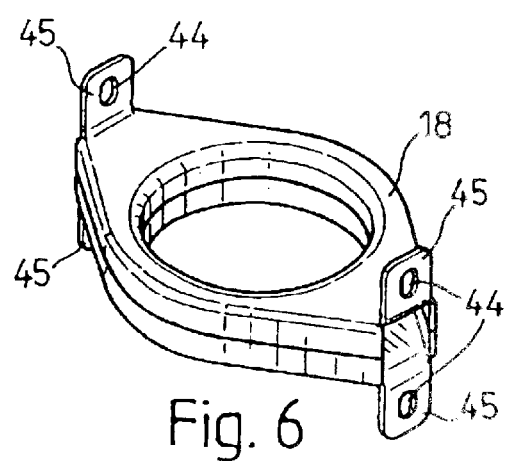
Figure 7:
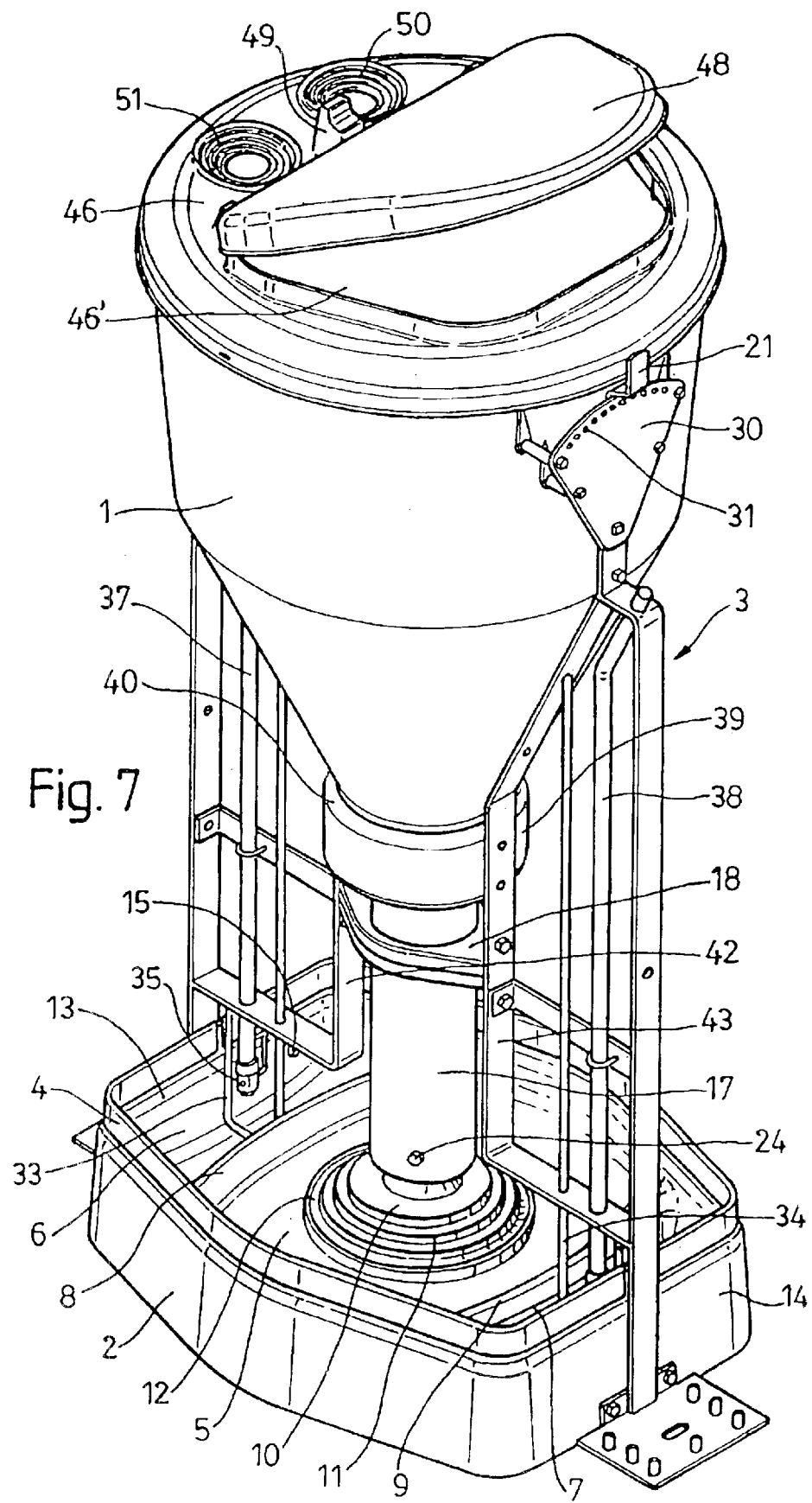
FIG. 7 is a perspective view of the livestock feeding assembly.

The area where the hopper 1 and the vertical pipe 17 are facing each other is surrounded and enclosed by a shielding shell 39 (FIG. 5) whose edges are bent towards the inside at its openings 40, the shell being formed by two mutually joined halves being provided with orifices 41 serving to secure them by means of bolts, rivets or other elements extending through them to vertical spans 42 and 43 of the frame, the clamp 18 also being secured to these latter by means of bolts and nuts for the fastening cooperating with orifices 44 of the two diametrically opposed lugs 45 of the clamp.

This livestock feeding assembly has been provided with a cover 46 fitted to the open top 47 of hopper 1, the cover having a wide opening 46' for manually charging the dry feed, the opening being apt to be closed with a lid 48 being linked in a hinged connection to a support 49 provided on cover 46 next to the edge of the opening 46'. Cover 46 is besides provided with circular areas 50 and 51 having a stepped section, each of the circular areas when perforated allowing to obtain an opening of adequate diameter allowing to connect the ducts allowing to carry out an automated dry feed or fodder supply.

What is claimed is:

1. A livestock feeding assembly comprising:

a hopper and a connected together by means of a frame, the hopper from which dry feed falls to the manger, and means to supply water to the manger which is fitted to the frame; wherein the manger is divided into a central area for the dry feed, and two adjacent lateral area is for the water, said two adjacent lateral areas directly abutting said central area, said central area is for the dry feed, and two adjacent lateral areas are separated by two transversal partitions, said transversal partitions structured and arranged for preventing said water from passing from said two adjacent lateral areas for water to said central area to thereby maintain said dry feed in a dry state, the central area comprising a centrally located, raised portion defining a plurality of steps, at least the lowest step having a slightly concave section, said two adjacent lateral areas each having a drain hole arranged at a lower level as compared with the top edge of said transversal partitions; said drain holes and said transversal partitions for preventing water from said two adjacent lateral areas from contacting said dry feed in said central area, and further comprising means to control a quantity of dry feed falling including a vertical pipe facing a bottom of the hopper and held by an axial rod associated to an external control arranged externally the hopper, a bottom end of said axial rods is attached to a lower portion of said vertical pipe by means of a bushing with radial arms, and a top end of said axial rod is linked in a pin-jointed connection transversal to a holder which is fitted to a transversal shaft, and integrally fitted and rotatable with the external control.

2. A livestock feeding assembly as per claim 1, wherein said means to supply water comprises a first and second nozzle; and wherein in coincidence with each of both lateral areas of the manger a U-shaped guard is fitted to the frame for connecting the hopper and the manger, each one of said U-shaped guards structured and arranged to protect one of said first and second nozzles whereby each of said first and second nozzles are located inside each one of said U-shaped guards.

3. A livestock feeding assembly as per claim 1, wherein the area where the bottom of the hopper and the vertical pipe are facing each other is surrounded and enclosed by a shielding shell formed by two halves and secured to the frame, a clamp guiding said pipe is also secured to the frame.

* * * * *